R. L. THOMPSON.
SOD CUTTING AND DISINTEGRATING MACHINE.
APPLICATION FILED MAY 10, 1920.

1,349,926.

Patented Aug. 17, 1920.
2 SHEETS—SHEET 1.

Inventor
R. L. Thompson

By Jack A. Schluj
Attorney

R. L. THOMPSON.
SOD CUTTING AND DISINTEGRATING MACHINE.
APPLICATION FILED MAY 10, 1920.
1,349,926.
Patented Aug. 17, 1920.
2 SHEETS—SHEET 2.
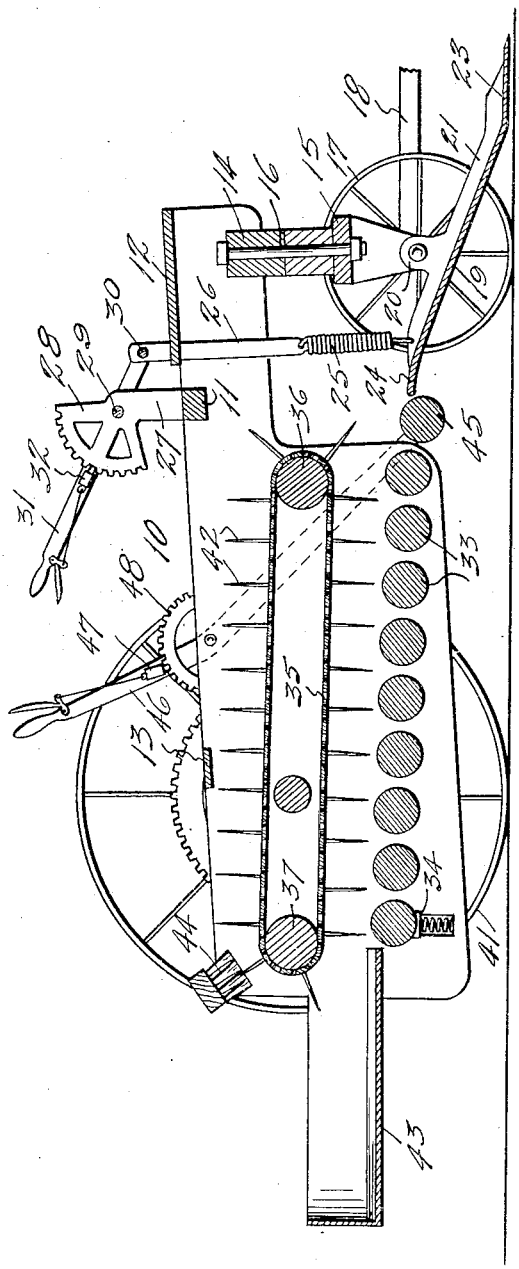
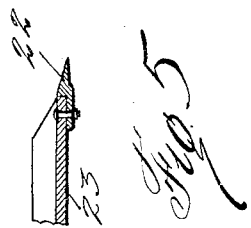
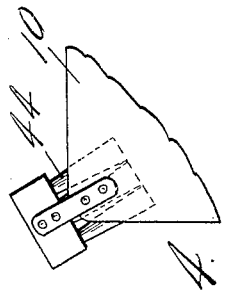
Inventor
R. L. Thompson
By Jack A. Schley
Attorney

UNITED STATES PATENT OFFICE.

ROBERT L. THOMPSON, OF TROUP, TEXAS.

SOD CUTTING AND DISINTEGRATING MACHINE.

1,349,926.   Specification of Letters Patent.   Patented Aug. 17, 1920.

Application filed May 10, 1920. Serial No. 380,264.

*To all whom it may concern:*

Be it known that I, ROBERT L. THOMPSON, a citizen of the United States, residing at Troup, in the county of Smith and State of Texas, have invented certain new and useful Improvements in Sod Cutting and Disintegrating Machines, of which the following is a specification.

This invention relates to new and useful improvements in sod cutting and disintegrating machines.

The purpose of the invention is to provide a machine which will cut the sod and elevate the same and then disintegrate said sod so that the grass and weeds are separated from the soil which latter is permitted to drop on the ground; and then to deliver the grass and the like in a convenient manner so that it may be collected and destroyed. The invention has particularly to do with certain novel features whereby these results are more efficiently and more satisfactorily carried out.

In carrying out the invention a wheel supported frame is provided with a front truck. A plow and elevator are carried by the front truck and adjustably sustained by yieldable means whereby the truck may turn without affecting the adjustment. The frame supports a plurality of spaced rollers over which a disintegrating belt travels rearwardly and acts to convey the sod and tear up the same as it passes over the rollers so that the soil will drop between the rollers and be left on the ground. Means is provided for removing the grass and other matter which might adhere to the disintegrating belt. The belt delivers the grass and the like into a chute which discharges the same at one side of the machine. A space is maintained between the rear end of the elevator and the first roller so that stones and the like may drop therebetween. However, if the sod is of such a nature as not to bridge this gap a roller is provided which may be swung into the space and so employed.

Figure 1:
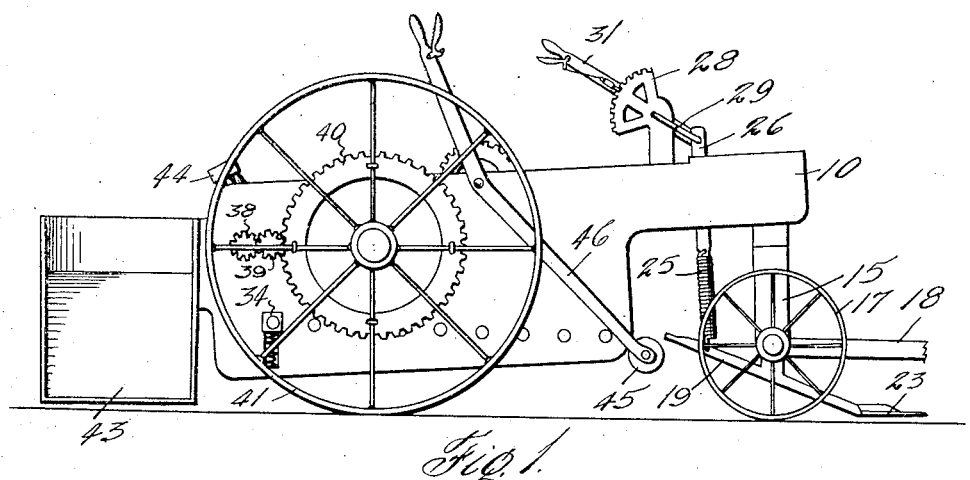
Figure 2:
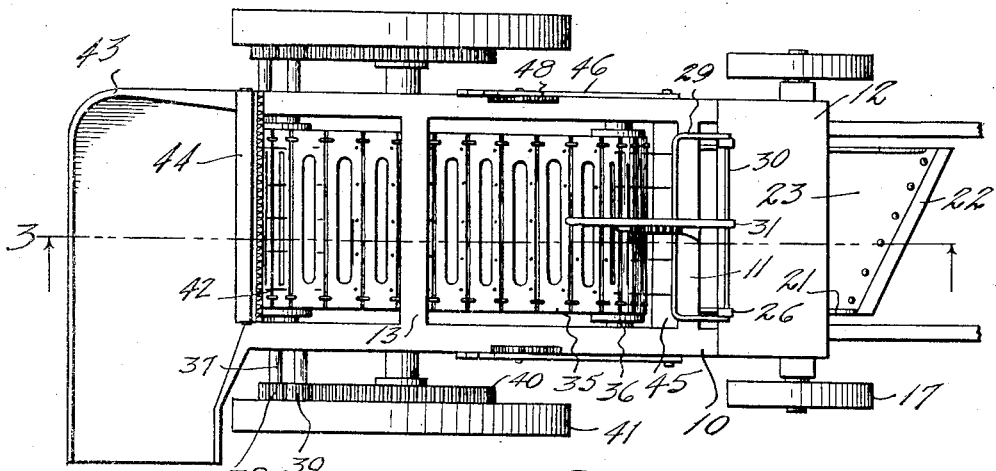

The invention will be more readily understood from a reading of the following specification and by reference to the accompanying drawings, in which an example of the invention is shown, and wherein:

Figure 1, is a side elevation of a machine constructed in accordance with my invention, Fig. 2 is a plan view of the same, Fig. 3 is a longitudinal vertical sectional view on the line 3—3 of Fig. 2, Fig. 4 is a detail of the grass removing brush, and Fig. 5 is a sectional detail of the removable plow point.

In the drawings the numeral 10 designates a frame which comprises upright side members. The side members of the frame are connected near their forward ends by a bar 11 at the top, a plate 12 and a cross bar 13 near the rear end. The front end of the frame is cut out and receives a bolster 14 to which a front truck 15 is pivoted by a central bolt 16. The truck is yoke shaped and is mounted on small front wheels 17. Draft bars 18 are attached to the truck 15. An inclined elevator 19 is provided with ears 20 which are pivoted within the truck at its lower end as is best shown in Fig. 3. The elevator is made in the form of a metal plate with upstanding guard flanges 21 along each side edge. The lower end of the elevator is bent and directed forwardly in a horizontal plane and is cut off at an angle to receive a detachable plow point 22 as is shown in detail in Figs. 2 and 5. The horizontal portion 23 forms a plow. The upper end of the elevator is curved downward as is shown at 24.

To the rear end of each flange 21 the lower end of a coil spring 25 is attached. Each coil spring has its upper end attached to a link 26 depending through the plate 12. At the center of the cross bar 11 a standard 27 is mounted and provided with a rearwardly directed segment 28. A yoke 29 passes through the upper end of the standard in concentric relation to the arc of the segment. This yoke extends transversely and has its ends pivoted to a cross bar 30 which passes through the upper ends of the links 26. A hand lever 31 is mounted on the yoke 29 in juxtaposition to the segment and also has its lower ends pivoted on the cross bar 30. The lever has a locking plunger 32 engaging the segment. It will be seen that by swinging the lever the yoke is rocked and the bar 30 raised and lowered whereby the links 26 are adjusted vertically. When the links are adjusted the elevator 21 will be swung and thus adjusted so that the plow point 22 may be made to operate at any desired depth. It is pointed out that the springs 25 provide a yieldable connection so that the truck 15 may freely turn around the corners and this is a very important feature.

Between the plates of the frame 10 a plurality of transverse rollers 33 is provided, these rollers are spaced apart sufficiently to permit soil to drop therebetween. The rearmost roller is mounted in spring supported bearings 34. The upper surface presented by the rollers inclines slightly upward toward the rear of the frame. An endless belt 35 is mounted on rollers 36 and 37 respectively, which are journaled in the side plates of the frame. The roller 37 has extensions extending through the frame and carries pinions 38 which mesh with gears 39 mounted on the frame and driven by large gears 40 fastened on the rear ground wheels 41 of the machine. Spikes or points 42 are provided transversely of the belt which is wide enough to extend substantially across the frame 10. These spikes pass rearwardly in close proximity to the rollers 33. The rear roller 33 is yieldably mounted so that any obstruction may pass between the same and the spikes.

An inclined chute 43 is mounted at the rear end of the frame 10 and inclines downwardly from one side across the machine and has its discharge end extending beyond the wheel 41 on the opposite side so that the grass and weeds delivered into the chute will be discharged to one side of the machine. A stiff brush 44 is mounted transversely across the upper rear end of the frame between the side plates so as to be engaged by the spikes 42, whereby the grass and roots adhering to these spikes will be brushed therefrom into the chute 43 and thus discharged. It will be seen that the belt will convey the sod rearwardly over the rollers and sufficient agitation will be had to disintegrate said sod so that the soil will fall between the rollers 33 and the grass will be carried rearwardly.

In case the sod is of a very loose nature and will not pass over the gap between the rear end 24 of the elevator 19 and the first roller 33, an auxiliary supported roller 45 journaled between the lower ends of levers 46, may be swung up into the gap as shown in the drawing and thus support the sod. The levers 46 are pivoted on the outer sides of the plates of the frame 10, near the upper edge of the latter and are provided with locking plungers 47 adapted to engage segments 48 mounted on the frame, whereby the roller 45 may be supported in the position which is desired. It is believed that the operation will be clearly understood without further description.

What I claim, is:

1. In a machine of the character described, a wheel supported frame, an inclined elevator, a forward truck supporting the frame and carrying the elevator, a plow attached to the front end of the elevator, a plurality of disintegrating rollers mounted in the frame and extending rearwardly with relation to the elevator, a rearwardly traveling disintegrating member passing over the rollers, means for removing material from said member mounted at the rear end of the frame, and a discharge element mounted at the rear end of the frame for discharging the material removed from the disintegrating member.

2. In a machine of the character described, the combination of a frame mounted on ground wheels, a wheel supported truck supporting the front end of the frame, an inclined elevator adjustably mounted on the truck, a plow attached to the elevator, means mounted on the frame for adjusting the elevation of the elevator and regulating the depth at which the plow operates, and disintegrating means mounted in the frame and receiving the material from the elevator.

3. In a machine of the character described, the combination of a frame mounted on ground wheels, a wheel supported truck supporting the front end of the frame, an inclined elevator adjustably mounted on the truck, a plow attached to the elevator, means mounted on the frame for adjusting the elevation of the elevator and regulating the depth at which the plow operates, disintegrating means mounted in the frame and receiving the sod from the elevator, means at the rear end of the frame for removing grass and the like from the disintegrating means, and means for discharging said removed grass to one side of the machine.

4. In a machine of the character described, the combination of a wheel supported frame, a front wheel truck pivoted to the front end of the frame, an elevator adjustably mounted on the truck and carrying a plow, means for adjustably supporting the elevator including extensible elements for permitting the elevator to swing with the truck when the latter is turned, and disintegrating means mounted in the frame and receiving the sod from the elevator.

5. In a machine of the character described, an elongated frame, ground wheels supporting the frame, a front wheel truck pivoted at the forward end of the frame, an elevator pivotally supported by the truck, a plow attached to the front end of the elevator, adjustable elements for supporting the rear end of the elevator including coil springs for permitting the elevator to swing with the truck, a plurality of transverse rollers journaled in the frame, an endless belt mounted in the frame and having spikes passing in close proximity to the rollers, a brush mounted at the rear end of the frame in the path of the spikes, and an inclined chute extending transversely across the rear end of the same and discharging matter at one side of the machine.

6. In a machine of the character described, an elongated frame, ground wheels supporting the frame, a front wheel truck pivoted at the forward end of the frame, an elevator pivotally supported by the truck, a plow attached to the front end of the elevator, adjustable elements for supporting the rear end of the elevator including coil springs for permitting the elevator to swing with the truck, a plurality of transverse rollers journaled in the frame, an endless belt mounted in the frame and having spikes passing in close proximity to the rollers, a brush mounted at the rear end of the frame in the path of the spikes, an inclined chute extending transversely across the rear end of the same and discharging matter at one side of the machine, and an auxiliary roller mounted on the frame so as to be swung in between the rear end of the elevator and the transverse rollers within the frame.

In testimony whereof I affix my signature.

ROBERT L. THOMPSON.